United States Patent
Takara et al.

(10) Patent No.: US 8,594,340 B2
(45) Date of Patent: Nov. 26, 2013

(54) TRANSMITTER

(75) Inventors: Tomio Takara, Naha (JP); Hiroshi Suzuki, Tokyo (JP); Takashige Tsukuma, Tokyo (JP); Yoshimaru Maruno, Tokyo (JP); Ichiro Okuyama, Tokyo (JP)

(73) Assignee: Field System, Inc., Tokyo (JP)

( * ) Notice: Subject to any disclaimer, the term of this patent is extended or adjusted under 35 U.S.C. 154(b) by 0 days.

(21) Appl. No.: 13/620,748

(22) Filed: Sep. 15, 2012

(65) Prior Publication Data

US 2013/0010979 A1    Jan. 10, 2013

Related U.S. Application Data

(63) Continuation-in-part of application No. PCT/JP2010/055335, filed on Mar. 26, 2010.

(51) Int. Cl.
*H04B 3/00* (2006.01)
*H04B 5/00* (2006.01)
*H04R 27/00* (2006.01)

(52) U.S. Cl.
USPC .............. 381/77; 381/78; 381/79; 381/80; 381/81; 381/82; 381/83; 381/84; 381/85

(58) Field of Classification Search
USPC ...................................... 381/77–85
See application file for complete search history.

(56) References Cited

U.S. PATENT DOCUMENTS

| | | | |
|---|---|---|---|
| 4,618,987 A * | 10/1986 | Steinke et al. | 381/82 |
| 5,884,259 A | 3/1999 | Bahl et al. | |
| 6,567,397 B1 | 5/2003 | Campana, Jr. et al. | |
| 2003/0125957 A1 | 7/2003 | Puterbaugh et al. | |
| 2003/0212549 A1 | 11/2003 | Steentra et al. | |

(Continued)

FOREIGN PATENT DOCUMENTS

| | | |
|---|---|---|
| CN | 101218768 A | 7/2008 |
| EP | 1906696 A1 | 4/2008 |

(Continued)

OTHER PUBLICATIONS

International Search Report in International Application No. PCT/JP2010/055335, of which the present application is a "bypass" continuation-in-part.

Written Opinion in International Application No. PCT/JP2010/055335, of which the present application is a "bypass" continuation-in-part.

(Continued)

*Primary Examiner* — Duc Nguyen
*Assistant Examiner* — Anita Masson
(74) *Attorney, Agent, or Firm* — JTT Patent Services, LLC; Gerald T. Peters (57) ABSTRACT

Where information is to be conveyed as acoustic waves, embodiments of the present invention provide a transmitter capable of causing acoustic waves that convey information to be not easily perceived by the human ear. A transmitter, being an apparatus that converts various types of encoded information into acoustic wave(s) in the audible spectrum and carries out transmission thereof, comprises microphone(s) that cause ambient sound(s) from location(s) at which acoustic wave(s) is/are transmitted to be input as ambient sound signal(s); peak frequency detector(s) that detect, within ambient sound signal(s), peak frequency or frequencies of major constituent(s) of ambient sound(s); carrier wave generator(s) that generate carrier waves at a plurality of frequencies that are natural number multiples of peak frequency or frequencies and that can be used to mask ambient sound(s); and modulator(s) that modulate a plurality of carrier waves with baseband signal(s).

9 Claims, 5 Drawing Sheets

(56) References Cited

U.S. PATENT DOCUMENTS

| | | |
|---|---|---|
| 2004/0073429 A1 | 4/2004 | Naruse |
| 2005/0219068 A1 | 10/2005 | Jones et al. |
| 2005/0226274 A1 | 10/2005 | Kwon et al. |
| 2008/0243491 A1* | 10/2008 | Matsuoka .................... 704/201 |
| 2009/0233582 A1 | 9/2009 | Suzuki et al. |

FOREIGN PATENT DOCUMENTS

| | | |
|---|---|---|
| EP | 1947793 A1 | 7/2008 |
| JP | 2003-186500 A | 7/2003 |
| JP | 2004-179956 A | 6/2004 |
| JP | 2005-122641 A | 5/2005 |
| JP | 3834579 B1 | 10/2006 |
| JP | 2007-104598 A | 4/2007 |
| WO | 0245286 A2 | 6/2002 |
| WO | 2005055566 A1 | 6/2005 |
| WO | 2007/000829 A1 | 4/2007 |
| WO | 2007/043376 A1 | 4/2007 |

OTHER PUBLICATIONS

Applicant brings to the attention of the Examiner the existence of copending U.S. Appl. No. 11/994,277 having overlapping inventorship and assigned to the same assignee as in present case (Field System, Inc.), which was filed on Dec. 28, 2007 and was published as US 2009/0233582 A1 on Sep. 17, 2009 (listed above), and which is the national stage of PCT/JP2005/014561, which was filed on Aug. 9, 2005 and was published as WO 2007/000829 A1 on Apr. 1, 2007 (listed above and attached hereto).

RS232, downloaded on Dec. 2, 2010 from www.machine-information-systems.com/RS232.html, pp. 1-2.

"Recommended Standard-232 (RS-232)," downloaded from www.businessdictionary.com on Dec. 2, 2010.

"Recommended Standard-232 (RS-232)—Glossary Entry," downloaded from www.mobile-phone-directory.org on Dec. 2, 2010, p. 1.

"What is RS-232," downloaded from www.wisegeek.com/what-is-rs-232.htm on Dec. 2, 2010, pp. 1-3.

* cited by examiner

|   | | preamble | | | SOF | type | length |
|---|---|---|---|---|---|---|---|
| 1 | data1 | data2 | data3 | data4 | data5 | data6 | data7 | CRC |
| 2 | data8 | data9 | data10 | data11 | data12 | data13 | data14 | CRC |
| 3 | data15 | data16 | data17 | data18 | data19 | data20 | data21 | CRC |
| 4 | data22 | data23 | data24 | data25 | data26 | data27 | data28 | CRC |
| 5 | data29 | data30 | data31 | data32 | data33 | data34 | data35 | CRC |
| 6 | data36 | data37 | data38 | data39 | data40 | data41 | data42 | CRC |
| 7 | data43 | data44 | data45 | data46 | data47 | data48 | data49 | CRC |
| 8 | data50 | data51 | data52 | data53 | data54 | data55 | data56 | CRC |
| 9 | data57 | data58 | data59 | data60 | data61 | data62 | data63 | CRC |
| 10 | data64 | data65 | data66 | data67 | data68 | data69 | data70 | CRC |
| 11 | data71 | data72 | data73 | data74 | data75 | data76 | data77 | CRC |
| 12 | data78 | data79 | data80 | data81 | data82 | data83 | data84 | CRC |
| 13 | data85 | data86 | data87 | data88 | data89 | data90 | data91 | CRC |
| 14 | data92 | data93 | data94 | data95 | data96 | data97 | data98 | CRC |
| 15 | data99 | data100 | data101 | data102 | data103 | data104 | data105 | CRC |
| 16 | data106 | data107 | data108 | data109 | data110 | data111 | data112 | CRC |

16 rows

Total number of bits: 1024

TRANSMITTER

CROSS-REFERENCE TO RELATED APPLICATION AND INCORPORATION BY REFERENCE

This application is a continuation-in-part of, and claims benefit of priority under 35 USC 120 to, copending International Application No PCT/JP2010/055335, entitled "Sending Device", filed 26 Mar. 2010, the content of which is incorporated herein in its entirety by reference.

FIELD OF THE INVENTION

The present invention relates to an information-providing system for providing various types of information to a terminal by means of acoustic waves, and in particular relates to a transmitter in the context of such an information-providing system.

BACKGROUND

Systems for providing various types of information to terminals have been proposed conventionally. For example, teletext broadcasts, in which text code, graphical information, program-related information, and so forth are superimposed on (multiplexed with) the broadcast signal to provide various types of information in addition to regular programming content to the television receiver or radio receiver, have been carried out in the context of radio and television broadcasts.

However, because teletext broadcast systems require that digital information be superimposed on the television or radio signal on which it will ride, this has necessitated complex broadcast facilities, which has increased cost and made easy provision of information to terminals impossible. On the other hand, with respect to methods whereby cameras of mobile telephone are used to capture QR codes, not only are these incapable of being employed in situations where the terminal is not equipped with a camera, but the procedures involved are only carried out with great difficulty by beginners or those not already mechanically inclined.

In light of such problems, novel information-providing methods for providing various types of information to terminals as acoustic waves with air serving as medium have been developed. In one such method in which information is conveyed in the form of an acoustic wave, use of an existing speaker and a microphone installed at a terminal makes it possible to convey information easily and inexpensively.

In one such information-conveying system, an information-encoding apparatus that converts an information payload into audio is employed to convey the information payload as audio by way of the I/O interface of existing audio-handling acoustic equipment, the information payload being reproduced based on audio received by an information-decoding apparatus. In such a system, it may be an object of the encoding technique employed that sound containing encoded information is to be rendered as pleasant music which is deliberately intended to be heard by humans.

Furthermore, information-providing systems developed by the present inventors include information-providing systems that provide information in the form of acoustic waves, with various types of information being encoded as millisecond-order data frames that include preambles for synchronization of timing.

Furthermore, information-providing systems developed by the present inventors also include information-providing systems in which various types of information are transmitted as information in the form of sound pressure oscillations, at which time the frequencies of transmission thereof are made to lie in the gaps between respective notes in a tempered scale.

Here, during use of such systems for conveying information as acoustic waves, because the acoustic waves which convey the information are audible sounds, there are cases where, depending on ambient conditions, these may be unpleasantly perceived as annoying by the human ear. Where this is the case, there is a possibility that transmission of acoustic waves for the purpose of conveying information at a store would cause customers who react unpleasantly to this to leave the store.

The present invention was conceived in light of such problems, it being an object thereof, in environments permitting information to be conveyed as acoustic waves, to provide a transmitter that is capable of causing acoustic waves that convey information to be not easily perceived by the human ear.

SUMMARY OF INVENTION

To solve the foregoing problems and/or other problems, a transmitter associated with one embodiment of the present invention, in the context of a transmitter that converts various types of encoded information into at least one acoustic wave in the audible spectrum and carries out transmission thereof, comprises at least one microphone that causes at least one ambient sound from at least one location at which the at least one acoustic wave is transmitted to be input as at least one ambient sound signal; at least one peak frequency detector that detects, within the at least one ambient sound signal, at least one peak frequency of at least one major constituent of the at least one ambient sound; at least one carrier wave generator that generates carrier waves at a plurality of frequencies that are natural number multiples of the at least one peak frequency; and at least one modulator that modulates and combines the plurality of carrier waves with at least one baseband signal.

Furthermore, in the context of a transmission program for causing at least one computer to convert various types of encoded information into at least one acoustic wave in the audible spectrum and to carry out transmission thereof from at least one speaker, a transmission program associated with another embodiment of the present invention causes the at least one computer to execute a peak frequency detection step in which, within at least one signal input by way of at least one microphone and containing at least one ambient sound from at least one location at which the at least one acoustic wave is transmitted, at least one peak frequency of at least one major constituent of the at least one ambient sound is detected; a carrier wave generation step in which carrier waves are generated at a plurality of frequencies that are natural number multiples of the at least one peak frequency; and a modulation step in which the plurality of carrier waves are modulated by and combined with at least one baseband signal.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Below, embodiments of the present invention are described with reference to the drawings. In an information-providing system associated with the present embodiment, messages, URLs, and/or various other types of information are sent as acoustic waves, with air serving as medium, from a transmitter to a receiver, the transmitter transmitting acoustic waves from a speaker, and the receiver receiving these acoustic waves by means of a microphone and carrying out decoding for recognition of the transmitted information.

One aspect of the present embodiment is that carrier waves which take into consideration the ambient sound present at the location at which the transmitter and receiver are installed, i.e., the location where sound pressure oscillation information (hereinafter "sonic code") in the form of acoustic waves is transmitted, are used to send sonic code. Ambient sound as used herein refers to sounds of cars and trains, the sound of the wind, and/or other such peripheral noises, or to people's voices, music, and/or other such sounds in the environs of the location at which the sonic code is transmitted.

Figure 1:
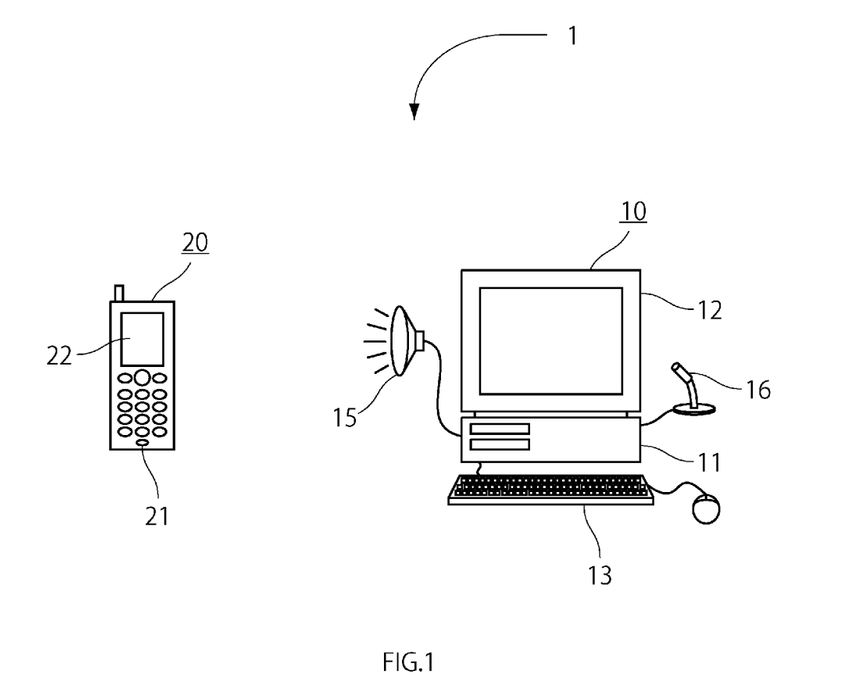
FIG. 1 is a schematic diagram showing in simplified fashion the constitution of an information-providing system associated with an embodiment of the present invention.

FIG. 1 is a drawing showing in schematic fashion the constitution of an information-providing system 1 associated with the present embodiment. As shown in same drawing, information-providing system 1 comprises transmitter 10 for transmitting various types of information as sonic code, and mobile telephone 20 serving as receiver for receiving sonic code.

Transmitter 10 is equipped with personal computer (PC) main body 11, display 12 constituting display means, input device 13 comprising a mouse and a keyboard, speaker 15 for transmitting sound constituting sonic code, and microphone 16 for input of ambient sound. Internal to PC main body 11 there are a processor or other such arithmetic unit for carrying out various types of operations, and storage devices comprising a hard disc drive (HDD) for storing programs and various other types of information, random access memory (RAM) capable of being used as a work area during arithmetic processing, and so forth.

Mobile telephone 20 is equipped with microphone 21 for picking up sonic code that has been transmitted from speaker 15, and display 22 for displaying various types of information. Furthermore, internal to mobile telephone 20 there are a processor or other such arithmetic unit for carrying out various types of operations, and memory for storing programs and various other types of information and for use as a work area during arithmetic processing.

Transmitter 10 of the above-described information-providing system 1 may be installed at a department store, supermarket, shopping mall, movie theater, amusement park, or other such commercial facility, entertainment facility, or the like. Furthermore, contemplated in the present embodiment is a situation in which mobile telephone 20 which serves as receiver is a terminal in the possession of a user who visits such a facility, the user being capable of using the terminal to receive acoustic waves constituting sonic code to obtain various types of information.

Various types of information that might be provided to such a terminal include, for example, messages in connection with products, events, facility-related information, and so forth, and text information including URLs of related Internet web pages or the like. By capturing a URL to the terminal by way of sonic code, a customer visiting such a facility can, without entering text from the keypad, use the terminal to access the Internet to acquire additional information or read a detailed product description.

The location at which transmitter 10 is installed is up to the discretion of the information provider, installation at other locations being of course permitted as appropriate. Furthermore, the content of the information being provided is not limited to text information, provision of image information and so forth also being possible.

Figure 2:
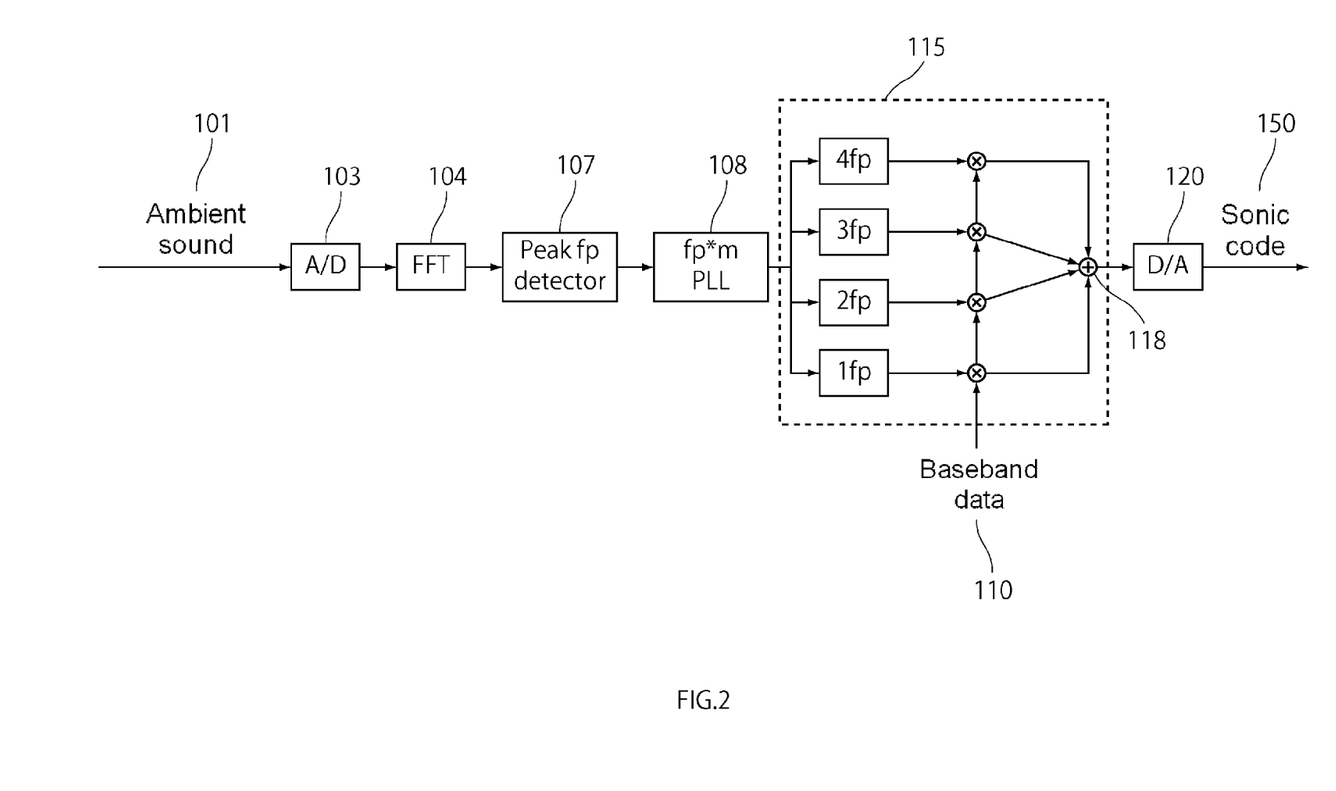
FIG. 2 is a block diagram showing the conceptual structure of circuitry for implementing functionalities related to generation of sonic code at a transmitter associated with the present embodiment.

Detailed description is next given with respect to processing that might be carried out at transmitter 10 to generate the sonic code which is transmitted toward mobile telephone 20. FIG. 2 is a block diagram showing the conceptual structure of circuitry for implementing functionalities related to generation of sonic code at the transmitter associated with the present embodiment. As described below, in the present embodiment, a plurality of carrier waves having frequencies that are natural number multiples of a peak frequency of ambient sound are used to carry out modulation.

Note that whereas the functionalities of the various components in FIG. 2 have here been shown as being implemented in software as a result of execution by arithmetic means at transmitter 10 of a program stored at a storage device, it is also possible to provide dedicated circuitry for performing such processing and to implement these in hardware.

As shown at same drawing, transmitter 10 is equipped with A/D converter 103, fast Fourier transform (FFT) unit 104, peak frequency detector 107, carrier wave generator 108, modulator 115, and D/A converter 120.

A/D converter 103 converts the analog electrical signal which is input from microphone 16 of transmitter 10 and which corresponds to ambient sound 101 into a digital signal. This ambient sound 101, is ambient sound present where transmitter 10 is installed; for example, sounds of trains and cars, the sound of the wind, or other such noise might correspond to ambient sound.

FFT unit 104 uses a fast Fourier transform to convert the time-domain signal to a frequency-domain signal. Peak frequency detector 107 might, for example, detect the frequency of the frequency-domain component within this ambient sound signal that has the highest sound pressure level to determine a peak frequency fp of a major constituent of ambient sound 101.

Detection of peak frequency fp by peak frequency detector 107 is carried out prior to transmission of sonic code 150, peak frequency fp being detected in the present embodiment based on sound pressure levels resulting from integration of ten samples of ambient sound 101, each of which is 10 ms in duration, captured in cyclical fashion.

Carrier wave generator 108 uses phase-locked loop (PLL) circuitry to generate carrier waves having frequencies that are m (where m is a natural number) times peak frequency fp. In the present embodiment, four carrier waves are generated, these having frequencies that are 1×, 2×, 3×, and 4× the peak frequency fp.

Modulator 115 of the present embodiment respectively modulates the foregoing four carrier waves with baseband signal 110, and has adder 118 for combining the four modulated waves. In the present embodiment, modulator 115 modulates all four carrier waves with the same baseband signal 110. That is, this results in the same information being sent in parallel fashion on the four carrier waves by transmitter 10, permitting great improvement in the accuracy with which it is received at the receiver.

In the present embodiment, modulator 115 uses phase shift keying (PSK) to modulate the respective carrier waves, and these four modulated waves are then combined at adder 118 and sent to D/A converter 120. Furthermore, in the present embodiment, modulator 115 is a single-sideband (SSB) modulator employing only the upper sideband (USB) obtained as a result of filtering.

Figure 3:
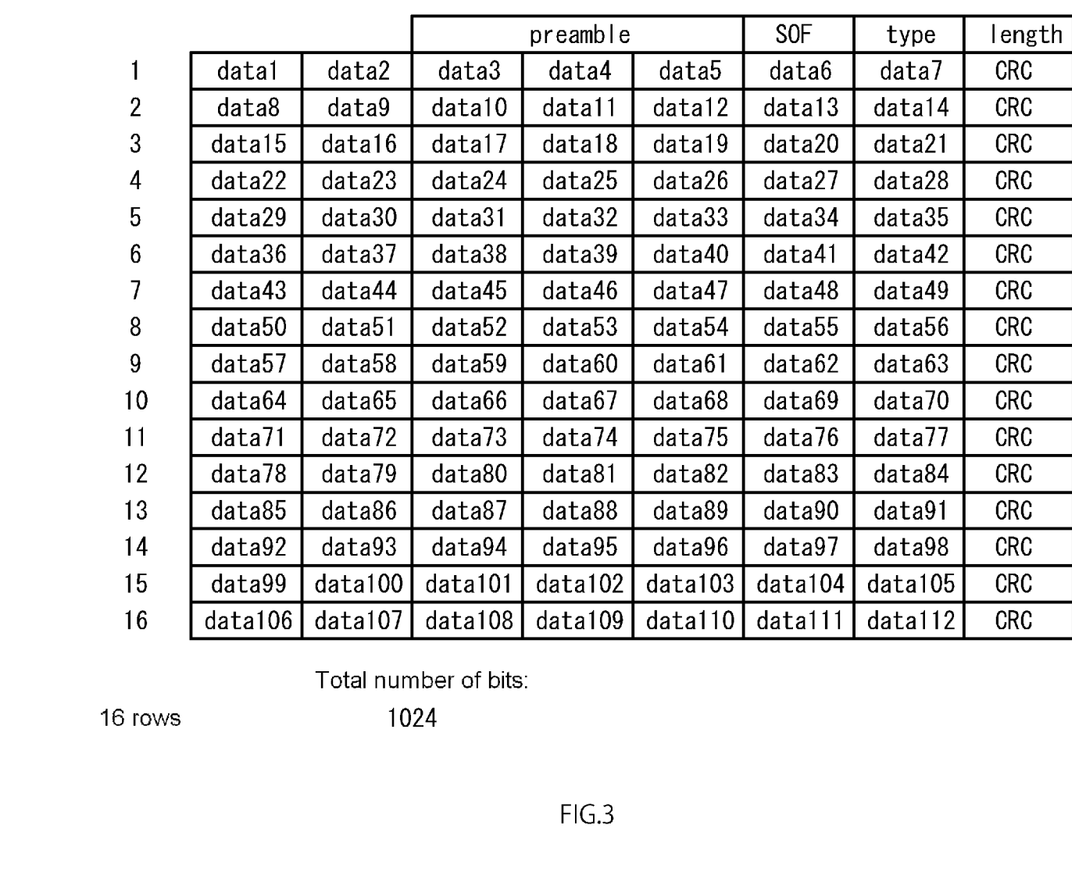
FIG. 3 is a drawing showing the data structure of a baseband signal associated with the present embodiment.

Here, the data frame structure of baseband signal 110 will be described with reference to FIG. 3. FIG. 3 is a drawing showing the data structure of the baseband signal in the present embodiment. The data frame shown in same drawing is provided with, in order: a preamble for synchronizing timing (preamble), a start-of-frame (SOF) identifier identifying the beginning of the frame, a section indicating data type (type), and a section indicating data length (length). Provided thereafter are 16 rows of data, each row of data being composed after the fashion data1, data2, . . . , data7, CRC (described below), such that this one frame is capable of handling 112 bytes of data, not counting CRCs, in the present embodiment.

The "type" may be used to identify information provider(s), limit recipient(s) to specific individual(s), and so forth. Furthermore, the "length" represents the length of the sonic code, which is constituted in the present embodiment so as to permit handling of a maximum of 16 of the frames shown in same drawing, or up 2,048 bytes of data, counting CRCs.

"CRC" refers to data appended for error checking and/or correction by means of, for example, a cyclic redundancy check. For example, CRC may in the present embodiment be redundant polynomial code for detection and correction of data errors, the CRC data being appended in advance to transmitted data so that error checking and/or correction can be carried out at the time of reception. Here, such processing is carried out not at the frame level, but instead a CRC is appended and error checking/correction is carried out every 7 bytes, making it possible to vary the amount of data that is sent as desired by varying the number of rows.

D/A converter 120 converts the combined modulated signal received from modulator 115 into an analog signal and sends this to speaker 15. This analog signal is transmitted as sonic code 150 in the form of acoustic waves from speaker 15.

In accordance with such constitution, when transmitting sonic code 150, ambient sound 101 input from microphone 16 is first converted into digital form by A/D converter 103. This digital signal from ambient sound 101 undergoes fast Fourier transformation at FFT unit 104, converting the time-domain signal to a frequency-domain signal.

In the present embodiment, peak frequency detector 107 detects the frequency of the frequency-domain component within this ambient sound signal that has the highest sound pressure level (as described in more detail below, this may be either a global or a local maximum), and takes this to be a peak frequency fp of a major constituent of the ambient sound. Carrier wave generator 108 then generates four subcarriers (carrier waves) having frequencies that are one, two, three, and four times peak frequency fp. For example, if peak frequency fp is taken to be 1 kHz, carrier wave generator 108 would generate carrier waves having frequencies of 1 kHz, 2 kHz, 3 kHz, and 4 kHz.

Modulator 115 then modulates this plurality of carrier waves with the same baseband signal 110, and thereafter combines these. This combined modulated signal is converted into an analog signal by D/A converter 120, and this is transmitted as sonic code 150 from speaker 15. Carrier Sense Multiple Access/Collision Detection (CSMA/CD) might, for example, be used as communication protocol.

Above, detailed description has been given with respect to a transmitter 10 that transmits sonic code 150; because the four carrier waves in sonic code 150 are modulated with the same baseband signal, this results in the same information being conveyed in parallel fashion on the four carrier waves, permitting great improvement in the accuracy with which it is received.

Furthermore, in the present embodiment, the peak frequency fp of ambient sound is detected, a plurality of carrier waves are generated based on this peak frequency fp, and sonic code 150 composed of such carrier waves is superimposed on ambient sound, such that masking due to ambient sound makes this a sound which is not easily perceived by the human ear.

Furthermore, where the ambient sound is a musical instrument performance or other such music, superimposition of the sonic code thereon merely changes the timbre of the ambient sound, so that from the perspective of someone listening to the music the playing of the sonic code causes almost no sense of discomfort.

Figure 4:
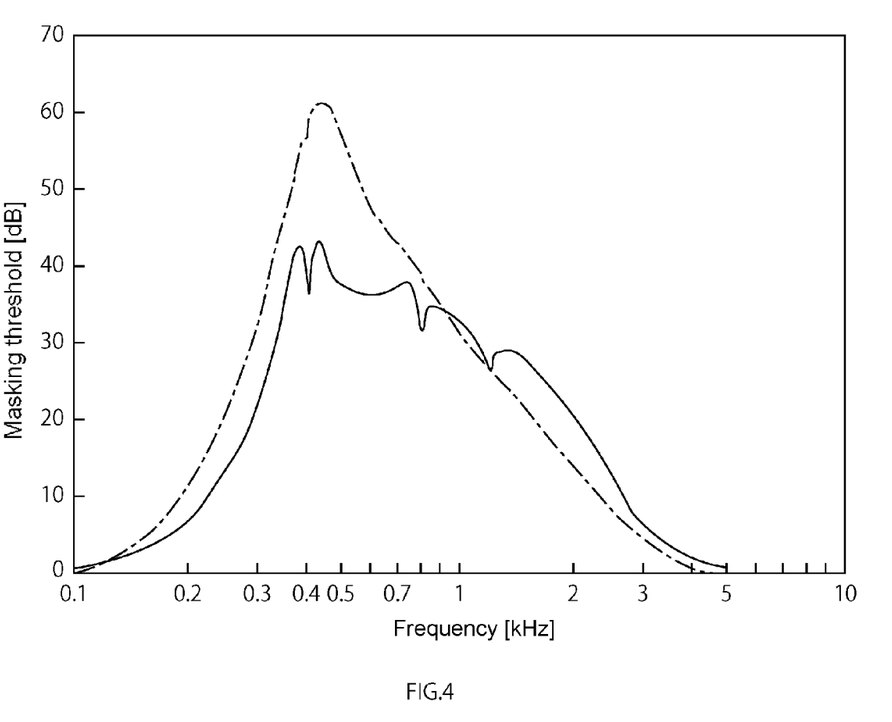
FIG. 4 is a drawing for explaining masking of sonic code by ambient sound as is associated with the present embodiment.

This masking of sonic code 150 by ambient sound will now be described in further detail. FIG. 4 is a drawing for explaining masking of sonic code by ambient sound as is associated with the present embodiment. Shown on the horizontal axis of same drawing is frequency [kHz], and shown on the vertical axis thereof is masking threshold [dB]. In the drawing, the solid line indicates masking threshold for a pure tone having a frequency of 400 Hz and a sound pressure level of 80 dB SPL, the threshold of hearing of a sound (masked sound) which is masked by the pure tone (masking sound) being given in terms of sensation level as experienced when there is no masking sound.

Accordingly, in the region below the solid line in FIG. 3, the masked sound is made not easily perceptible such that only the masking sound (pure tone) is heard. On the other hand, the alternating long and short chain line in the drawing indicates masking threshold when the masking sound is 80-dB narrowband noise having a bandwidth of 90 Hz centered on the frequency 410 Hz.

Here, it is contemplated that the sound being produced in ordinary environments in which sonic code transmitter 10 may be installed, e.g., outdoor locations or the like, will have some degree of bandwidth. Upon therefore examining the masking threshold indicated by the alternating long and short chain line for the situation in which the masking sound is narrowband noise, it is seen that the masking effect is attained over a wide range that extends toward both low-frequency side and the high-frequency side of the central frequency of the noise. Accordingly, adequate masking effect may also be attained with a plurality of carrier waves such as may encompass a wide range within the audible spectrum as in the present embodiment.

Furthermore, upon examining the masking threshold indicated by the solid line for the situation in which the masking sound is a pure tone, it is seen that masking effect increases in the vicinities of frequencies that are natural number multiples (harmonics) of the pure tone masking sound. Accordingly, by, as in the present embodiment, employing carrier waves having frequencies that are one, two, three, and four times the peak frequency of the ambient sound, and thus causing harmonics (sounds having frequencies that are natural number multiples of the peak frequency) thereof, for which masking effect is large, to be employed as carrier waves, it is possible to obtain increased masking effect.

Moreover, the constitution of the transmitter which has been described above admits of any number of variations without departing from the gist of the present invention. For example, the number of carrier waves generated by carrier wave generator 108 is not limited to four, but may be varied as appropriate.

Note, however, that it is preferred that the number of carrier waves be three or more. This is so because, in the present embodiment, since the plurality of carrier waves which will be combined are modulated by the same baseband signal 110, use of three or more carrier waves having different frequencies makes it possible for the receiver to accept as the correct signal only that which is obtained when the baseband signal demodulated from two or more carrier waves agrees, thus making it possible to ensure that accurate information is received.

Furthermore, it is preferred that the frequencies of the carrier waves generated by carrier wave generator 108 be chosen so as to be 12 kHz or less. This is because acoustic waves that are 12 kHz or less can be transmitted and received by most speakers and microphones. Furthermore, it is similarly preferred based upon consideration of speaker and microphone frequency characteristics that carrier wave frequency be 800 Hz or greater.

Note that whereas, in the embodiment described above, four carrier waves were generated, these having frequencies that were 1×, 2×, 3×, and 4× the peak frequency fp, any suitable number of carrier waves having frequencies that are natural number multiples of the peak frequency may be employed. For example, carrier waves having frequencies that are, for example, 5× or 10× the peak frequency fp may be employed. While it is possible to select any desired frequencies as appropriate for use as carrier waves, it is preferred that the carrier wave frequencies be natural number multiples of peak frequency, and it is preferred that carrier wave frequencies be within the foregoing range of 800 Hz to 12 kHz.

Furthermore, in the embodiment described above, whereas PLL circuitry was used to generate the carrier waves, these may be generated using circuitry other than PLL circuitry.

Furthermore, peak frequency fp need not be the frequency at which sound pressure is a global maximum, it being possible to employ a peak frequency fp that is a local maximum of any among a number of frequency components that make up the ambient sound and that are of at least moderate magnitude, it being possible for such components to be considered major constituents of the ambient sound. This is because adequate masking effect can be attained for carrier waves that are harmonics of any of a number of tones which may be considered to be major constituents of the ambient sound.

Whereas the present invention has been described above in terms of an embodiment in which one peak frequency of one major constituent of one ambient sound was detected, and carrier waves were generated at frequencies that were natural number multiples of this one peak frequency, there is no objection to detection of multiple peak frequencies corresponding to multiple major constituents within the same or different ambient sound(s). Furthermore, the term "peak frequency" as used herein need not refer to a single frequency at which amplitude is a global maximum, but may refer to one among a plurality of peak frequencies, amplitude at each of which is a local maximum. Moreover, the term "major constituent" as used herein need not refer to a single dominant ambient sound constituent, but may refer to one among a plurality of major constituents thereof, each of which may have multiple peak frequencies. Where there are multiple ambient sounds, multiple major constituents, and/or multiple peak frequencies, embodiments of the present invention may variously detect any one or more of these peak frequencies, and may generate carrier waves at frequencies that are natural number multiples of any one or more of these detected peak frequencies.

Note that whereas, in the embodiment described above, peak frequency fp was detected based on integration of ten samples of ambient sound 101, each of which was 10 ms in duration, any suitable number of samples of any suitable duration may be employed. For example, the number of samples, timing with which samples are captured, and so forth during detection of peak frequency fp by peak frequency detector 107 may be varied as appropriate.

Furthermore, where detection of the peak frequency fp of ambient sound by peak frequency detector 107 would be difficult, to prevent occurrence of error or the like when no suitable peak frequency fp can be detected, a predefined frequency might be employed as initial or default value for peak frequency. For example, 880 Hz (the note "La") or 1,047 Hz (the note "Fa") might be employed as such an initial or default value for peak frequency.

Furthermore, whereas the present embodiment has been described in terms of a situation in which PC main body 11 and speaker 15 are installed at the same location, speaker 15 may be installed at a location that is removed by some distance from PC main body 11. In such a situation, it will be necessary for measurement of the ambient sound at the location at which sonic code 150 is transmitted that microphone 16 be installed at the same location as speaker 15.

Figure 5:
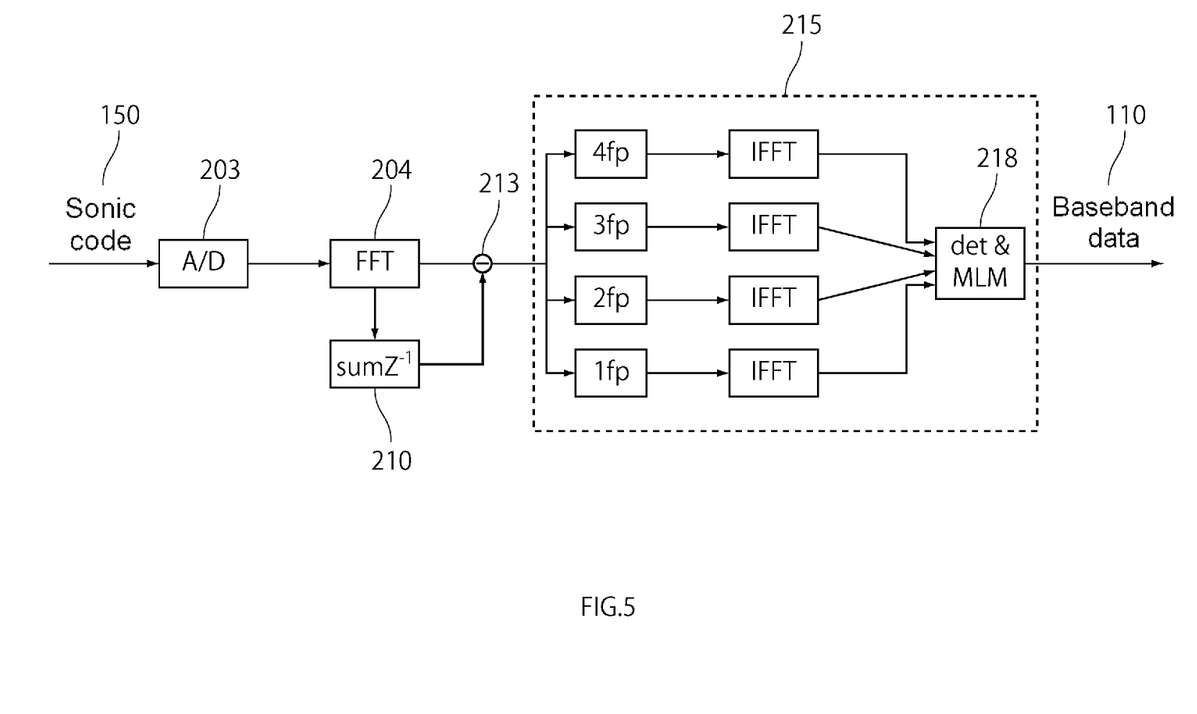
FIG. 5 is a block diagram showing the conceptual structure of circuitry for implementing functionalities related to reception of sonic code at a mobile telephone associated with the present embodiment.

Detailed description will next be given with respect to processing in connection with reception of sonic code 150 at mobile telephone 20. FIG. 5 is a block diagram showing the conceptual structure of circuitry for implementing functionalities related to reception of sonic code at a mobile telephone associated with the present embodiment. Note that whereas the functionalities of the various components in FIG. 5 have here been shown as being implemented in software as a result of execution by arithmetic means at mobile telephone 20 of a program stored at a storage device, it is also possible to provide dedicated circuitry for performing such processing and to implement these in hardware.

As shown at same drawing, mobile telephone 20 is equipped with A/D converter 203, FFT unit 204, ambient sound capturer 210, ambient sound subtractor 213, and demodulator 215. Ambient sound capturer 210 captures, over a prescribed interval of time, the ambient sound signal as it exists when no sonic code is present.

Ambient sound subtractor 213 subtracts the ambient sound signal captured at ambient sound capturer 210 from ambient sound on which the sonic code has been superimposed to extract the sonic code component therefrom. That is, ambient sound capturer 210 and ambient sound subtractor 213 carry out adaptive noise reduction processing.

Demodulator 215, which carries out demodulation of the respective carrier waves after they have been made to undergo Fourier transformation, has maximum-likelihood processor 218 which uses the maximum-likelihood method (MLM) to determine the baseband signal from the plurality of demodulated signals.

Demodulator 215 divides frequency-domain sonic code components into respective carrier waves, thereafter carries out inverse fast Fourier transformation (IFFT) on each of these to restore these to the time domain, and demodulate these by means of PSK. Maximum-likelihood processor 218 uses the maximum-likelihood method to determine the baseband signal from the demodulated signal containing the respective demodulated carrier waves. The present embodiment is configured to only accept as the correct signal that which is obtained when the baseband signal demodulated from two or more carrier waves agrees.

In accordance with such constitution, sound picked up by microphone 21 of mobile telephone 20 is sent to A/D converter 203. A/D converter 203 samples the input analog signal to convert it into a digital signal, and the digital signal is sent to FFT unit 204. FFT unit 204 carries out fast Fourier transformation to convert the digital signal into its frequency-domain components.

Here, prior to reception of the sonic code, ambient sound capturer 210 captures, over a prescribed interval of time, the ambient sound signal which is output from FFT unit 204. Thereafter, when ambient sound on which sonic code 150 has been superimposed is input thereto, it is converted into a frequency-domain signal at FFT unit 204. Ambient sound subtractor 213 then subtracts the ambient sound signal captured at ambient sound capturer 210 from the frequency-domain version of the received signal to extract the sonic code component, i.e., the signal component which was transmitted from transmitter 10.

The sonic code component is input into demodulator 215. Demodulator 215 uses PSK to demodulate the respective frequency-domain carrier waves, and the baseband signal is determined at maximum-likelihood processor 218, permitting extraction of various types of information.

Above, an information-providing system associated with the present embodiment has been described, this information-providing system making it possible, through selection of frequencies permitting attainment of masking effect with respect to ambient sound for use as frequencies for transmission of sonic code based on ambient sound peak frequency, to avoid causing sonic code to be perceived as annoying by the human ear.

Note that the embodiments of the present invention are not limited to the foregoing embodiment, any number of variations being possible without departing from the essence of the present invention.

For example, the receiving terminal is not limited to a mobile telephone, but may be any type of terminal so long as it is equipped with microphone(s). For example, this may be a PDA, IC recorder, portable radio, portable television, laptop computer, radio cassette player, video game device, or the like. Furthermore, a special-purpose terminal may be provided for implementing the present invention.

Although the data frame in the embodiment described above employed sonic code, the length of which was a maximum of 16 frames, each frame containing 16 rows, each row containing 7 bytes of data, this data frame structure has been given for illustrative purposes only, it being possible to employ any suitable data frame structure for transmission of sonic code.

Although a cyclic redundancy check (CRC) was employed in the embodiment described above, any suitable error-checking and/or error-correcting method may be employed. For example, although a CRC check was carried out for each row of data transmitted in the embodiment described above, error-checking and/or error-correction may alternatively or additionally be carried out for each frame of data transmitted.

As described above, embodiments of the present invention make it possible to provide a transmitter that is capable of causing acoustic waves for conveying information to be transmitted as sound not easily perceived by the human ear.

Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A transmitter that converts various types of encoded information into at least one acoustic wave in the audible spectrum and carries out transmission thereof, the transmitter comprising:
   at least one microphone that causes at least one ambient sound from at least one location at which the at least one acoustic wave is transmitted to be input as at least one ambient sound signal;
   at least one peak frequency detector that detects, within the at least one ambient sound signal, at least one peak frequency of at least one major constituent of the at least one ambient sound;
   at least one carrier wave generator that generates carrier waves at a plurality of frequencies that are natural number multiples of the at least one peak frequency; and
   at least one modulator that modulates and combines the plurality of carrier waves with at least one baseband signal.

2. A transmitter according to claim 1 wherein at least one frequency of at least one of the carrier waves generated by the at least one carrier wave generator is between 800 Hz and 12 kHz.

3. A transmitter according to claim 1 wherein the at least one modulator modulates the plurality of carrier waves with the same baseband signal.

4. A transmitter according to claim 2 wherein the at least one modulator modulates the plurality of carrier waves with the same baseband signal.

5. A transmitter according to claim 1 wherein the at least one carrier wave generator generates at least three carrier waves.

6. A transmitter according to claim 2 wherein the at least one carrier wave generator generates at least three carrier waves.

7. A transmitter according to claim 3 wherein the at least one carrier wave generator generates at least three carrier waves.

8. A transmitter according to claim 4 wherein the at least one carrier wave generator generates at least three carrier waves.

9. A transmission program for causing at least one computer to convert various types of encoded information into at least one acoustic wave in the audible spectrum and to carry out transmission thereof from at least one speaker, the transmission program causing the at least one computer to execute:
   a peak frequency detection step in which, within at least one signal input by way of at least one microphone and containing at least one ambient sound from at least one location at which the at least one acoustic wave is transmitted, at least one peak frequency of at least one major constituent of the at least one ambient sound is detected;

a carrier wave generation step in which carrier waves are generated at a plurality of frequencies that are natural number multiples of the at least one peak frequency; and a modulation step in which the plurality of carrier waves are modulated by and combined with at least one baseband signal.

* * * * *